United States Patent
Klein et al.

(10) Patent No.: US 11,312,111 B2
(45) Date of Patent: Apr. 26, 2022

(54) COMPOSITE PANE HAVING ELECTRICALLY CONTROLLABLE OPTICAL PROPERTIES

(71) Applicant: SAINT-GOBAIN GLASS FRANCE, Courbevoie (FR)

(72) Inventors: Marcel Klein, Baesweiler (DE); Georg Schmidt, Langerwehe (DE); Li-Ya Yeh, Geilenkirchen (DE); Michael Labrot, Aachen (DE); Alicia Dröge, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 143 days.

(21) Appl. No.: 16/620,251

(22) PCT Filed: Sep. 10, 2018

(86) PCT No.: PCT/EP2018/074247
§ 371 (c)(1),
(2) Date: Dec. 6, 2019

(87) PCT Pub. No.: WO2019/068419
PCT Pub. Date: Apr. 11, 2019

(65) Prior Publication Data
US 2021/0078300 A1    Mar. 18, 2021

(30) Foreign Application Priority Data
Oct. 4, 2017    (EP) .................................... 17194703

(51) Int. Cl.
*B32B 17/10*    (2006.01)
*G02F 1/1333*    (2006.01)
(Continued)

(52) U.S. Cl.
CPC .. *B32B 17/10302* (2013.01); *B32B 17/10036* (2013.01); *B32B 17/10504* (2013.01);
(Continued)

(58) Field of Classification Search
CPC .......... B32B 17/10036; B32B 17/1022; B32B 17/10871; B32B 17/10972; B32B 17/10651
See application file for complete search history.

(56) References Cited

U.S. PATENT DOCUMENTS

| 6,056,861 A | 5/2000 | Fuhr et al. |
| 2011/0171443 A1 | 7/2011 | Thompson |

(Continued)

FOREIGN PATENT DOCUMENTS

| DE | 10 2005 007427 A1 | 8/2006 |
| DE | 10 2005 049081 B3 | 6/2007 |

(Continued)

OTHER PUBLICATIONS

International Search Report as issued in International Patent Application No. PCT/EP2018/074247, dated Oct. 19, 218.
(Continued)

*Primary Examiner* — George R Koch
*Assistant Examiner* — Christopher C Caillouet
(74) *Attorney, Agent, or Firm* — Pillsbury Winthrop Shaw Pittman LLP

(57) ABSTRACT

A composite pane having electrically controllable optical properties, includes an outer pane and an inner pane that are joined to one another via a thermoplastic intermediate layer, wherein a functional element having electrically controllable optical properties is embedded in the intermediate layer, the functional element including an active layer between a first carrier film and a second carrier film, wherein the intermediate layer contains a first thermoplastic material
(Continued)

Figure 1:
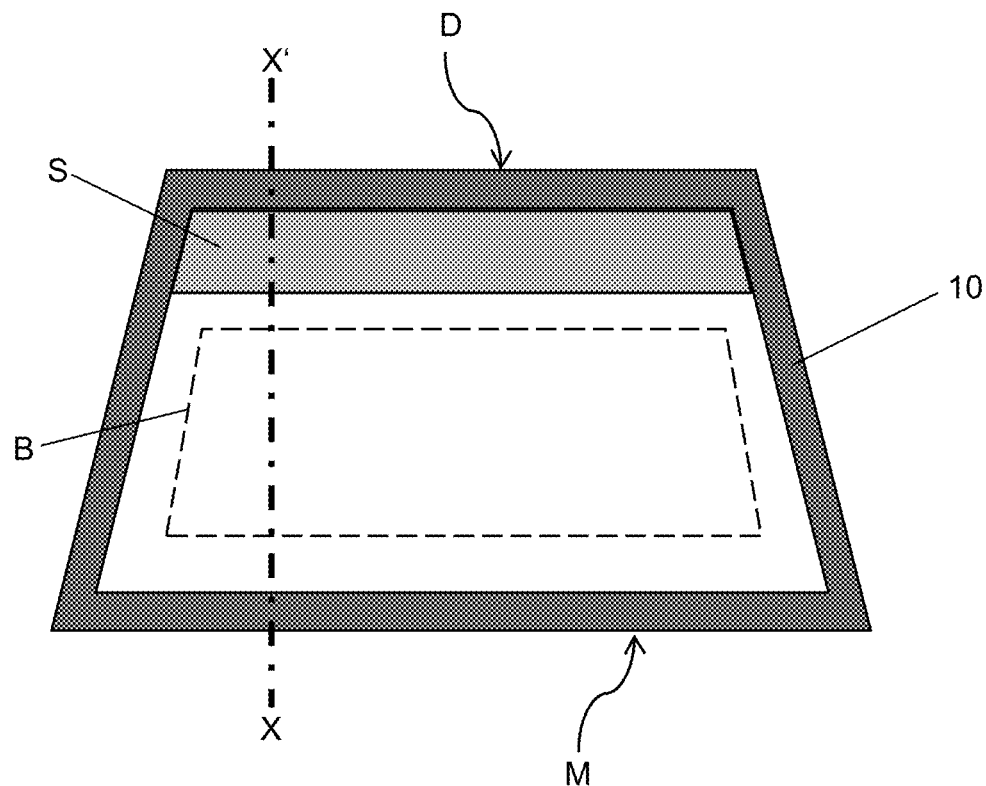

and the carrier films contain a second thermoplastic material, and wherein the first carrier film and the second carrier film are fused together along at least one region of the side edge of the functional element.

16 Claims, 5 Drawing Sheets

(51) Int. Cl.
- *B60J 1/00* (2006.01)
- *B60J 3/00* (2006.01)
- *G02F 1/1334* (2006.01)
- *G02F 1/17* (2019.01)

(52) U.S. Cl.
CPC .. *B32B 17/10532* (2013.01); *B32B 17/10761* (2013.01); *B32B 17/10779* (2013.01); *B32B 17/10807* (2013.01); *B60J 1/001* (2013.01); *B60J 3/007* (2013.01); *G02F 1/1334* (2013.01); *G02F 1/133325* (2021.01); *G02F 1/133331* (2021.01); *G02F 1/172* (2013.01); *B32B 2605/00* (2013.01); *G02F 2202/28* (2013.01)

(56) References Cited

U.S. PATENT DOCUMENTS

| | | | |
|---|---|---|---|
| 2015/0298431 | A1 | 10/2015 | Von Der Weiden et al. |
| 2015/0301367 | A1 | 10/2015 | Mennig |
| 2016/0138328 | A1 | 5/2016 | Behmke et al. |
| 2017/0122027 | A1 | 5/2017 | Bumann et al. |
| 2018/0281570 | A1* | 10/2018 | Labrot .............. B32B 17/10339 |
| 2018/0363172 | A1* | 12/2018 | Keating ................. D03D 15/43 |
| 2020/0061974 | A1* | 2/2020 | Droge ............... B32B 17/10504 |

FOREIGN PATENT DOCUMENTS

| | | |
|---|---|---|
| DE | 10 2007 027296 A1 | 12/2008 |
| DE | 10 2008 026339 A1 | 12/2009 |
| DE | 10 2013 001334 A1 | 7/2014 |
| EP | 0 876 608 B1 | 11/1998 |
| EP | 2 917 782 A1 | 9/2015 |
| EP | 3 610 323 A1 | 2/2020 |
| EP | 3 610 323 B1 | 12/2020 |
| JP | H04-257435 A | 9/1992 |
| JP | H06-272461 A | 9/1994 |
| JP | 2008-276057 A | 11/2008 |
| JP | 2009-500271 A | 1/2009 |
| JP | 2009-534246 A | 9/2009 |
| JP | 2014-518837 A | 8/2014 |
| WO | WO 2007/122426 A1 | 11/2007 |
| WO | WO 2007/122427 A1 | 11/2007 |
| WO | WO 2007/122428 A1 | 11/2007 |
| WO | WO 2011/033313 A1 | 3/2011 |
| WO | WO 2012/154663 A1 | 11/2012 |
| WO | WO 2014/023475 A1 | 2/2014 |
| WO | WO 2014/029536 A1 | 2/2014 |
| WO | WO 2014/072137 A1 | 5/2014 |
| WO | WO 2017/153330 A1 | 9/2017 |

OTHER PUBLICATIONS

Office Action as issued in European Patent Application No. 18762860. 7, dated Jun. 17, 2021.

Notification of Reason for Refusal as issued in Korean Patent Application No. 10-2020-7008919, dated Jul. 15, 2021.

Office Action as issued in Japanese Patent Application No. 2020-519344, dated Jun. 8, 2021.

Notice of Allowance as issued in Korean Patent Application No. 10-2020-7008919, dated Jan. 4, 2022.

* cited by examiner

COMPOSITE PANE HAVING ELECTRICALLY CONTROLLABLE OPTICAL PROPERTIES

CROSS-REFERENCE TO RELATED APPLICATIONS

This application is the U.S. National Stage of PCT/EP2018/074247, filed. Sep. 10, 2018, which in turn claims priority to European patent application number 17194703.9 filed Oct. 4, 2017. The content of these applications are incorporated herein by reference in their entireties.

The invention relates to a composite pane having electrically controllable optical properties, a method for its production, and its use.

Composite panes having electrically controllable functional elements are known per se. The optical properties of the functional elements can be changed by an applied electrical voltage. SPD functional elements (suspended particle device), which are known, for example, from EP 0876608 B1 and WO 2011033313 A1, are an example of such functional elements. By means of the applied voltage, the transmittance of visible light can be controlled by SPD functional elements. PDLC functional elements (polymer dispersed liquid crystal), known, for example, from DE 102008026339 A1, are another example. The active layer contains liquid crystals that are embedded in a polymer matrix. When no voltage is applied, the liquid crystals are oriented in a disorderly fashion, resulting in strong scattering of the light passing through the active layer. When a voltage is applied on the surface electrodes, the liquid crystals align themselves in a common direction and the transmittance of light through the active layer is increased. The PDLC functional element acts less by reducing total transmittance than by increasing the scattering, as a result of which free through-vision can be prevented or protection against glare can be ensured.

Windshields have been proposed in which an electrically controllable sun visor is realised by such a functional element to replace the prior art mechanically foldable sun visor in motor vehicles. Windshields with electrically controllable sun visors are, for example, known from DE 102013001334 A1, DE 102005049081 B3, DE 102005007427 A1, and DE 102007027296 A1.

SPD and PDLC functional elements are commercially available as multilayer films, wherein the active layer and the surface electrodes necessary for applying a voltage are arranged between two carrier films, typically made of PET. During production of the composite pane, the functional element is cut out of the multilayer film in the desired size and shape and inserted between the films of an intermediate layer by means of which two glass panes are laminated together to form the composite pane. The side edge of the functional element is open such that the active layer has contact with the material of the intermediate layer of the composite pane via the side edge. Polyvinyl butyral (PVB) that contains plasticisers is often used for the intermediate layer. The plasticiser or other chemical components of the intermediate layer can diffuse into the active layer, possibly resulting in corrosion or degradation of the active layer. This manifests itself, in particular, as decolouration or discolouration of the active layer in the edge region, which can adversely affect the function and the optical appearance of the functional element.

WO2012154663A1 and WO2014023475A1 propose sealing the edge of the functional element with a polymeric tape, preferably made of polyimide, to prevent adverse effects on the active layer. However, if the relevant side edge of the functional element is visible in through-vision through the composite pane, this solution has the disadvantage that the tape is possibly visually perceivable, which is also not very attractive aesthetically.

The object of the present invention is to provide an improved composite pane having electrically controllable optical properties, with which, at least in regions, no diffusion occurs between the active layer of the functional element and the intermediate layer. Moreover, efficient production methods for such a composite pane should be provided.

The object of the present invention is accomplished by a composite pane having electrically controllable optical properties according to the independent claim 1. Preferred embodiments are evident from the dependent claims.

The composite pane according to the invention comprises at least an outer pane and an inner pane that are joined to one another via an intermediate layer. The composite pane is intended to separate the interior from the external environment, in a window opening, for example, of a vehicle, of a building, or of a room. In the context of the invention, "inner pane" refers to the pane facing the interior. "Outer pane" refers to the pane facing the external environment.

The thermoplastic intermediate layer serves to join the two panes, as is customary with composite panes. Typically used are thermoplastic films, from which the intermediate layer is constructed. The intermediate layer contains a first thermoplastic material, is based on the first thermoplastic material, or is made of the first thermoplastic material. In addition to the actual thermoplastic polymer (preferably ethylene vinyl acetate (EVA), polyvinyl butyral (PVB), polyurethane (PU), or copolymers or mixtures thereof), the intermediate layer or the first thermoplastic material can contain other components, in particular a plasticiser, but also, for example, UV or IR absorbers.

The composite pane according to the invention contains a functional element having electrically controllable optical properties that is embedded in the intermediate layer. The functional element is arranged between at least two layers of thermoplastic material of the intermediate layer, wherein is bonded to the outer pane by the first layer and to the inner pane by the second layer. Preferably, the side edge of the functional element is completely surrounded by the intermediate layer such that the functional element does not extend to the side edge of the composite pane and, thus, has no contact with the surrounding atmosphere.

The functional element comprises at least one active layer, which is arranged between a first carrier film and a second carrier film. The active layer has the variable optical properties that can be controlled by an electrical voltage applied on the active layer. In the context of the invention, "electrically controllable optical properties" means those properties that are infinitely controllable but also those that can be switched between two or more discrete states. Said optical properties relate, in particular, to light transmittance and/or scattering behaviour. The functional element also comprises surface electrodes for applying voltage to the active layer, which are preferably arranged between the carrier films and the active layer. The carrier films contain, are made of, or are based on a second thermoplastic material. The second thermoplastic material differs from the first thermoplastic material of the intermediate layer in terms of chemical composition. Thus, the first thermoplastic material can be based on a different thermoplastic polymer than the second thermoplastic material. In principle, however, the two thermoplastic materials can also be based on the same thermoplastic polymer and differ in terms of additives, in particular the plasticiser content.

According to the invention, the first carrier film and the second carrier film of the functional element are fused together along at least one region of the circumferential side edge of the functional element. In this region, the functional element has no open side edge; instead, the active layer is surrounded by the second thermoplastic material. The active layer is thus effectively isolated from the first thermoplastic material of the intermediate layer such that no diffusion can take place between the intermediate layer and the active layer and degradation of the active layer is prevented. In other words, said region of the side edge of the functional element is sealed. Compared to sealing the side edge with an additionally applied material, for example, a polymeric tape, the solution according to the invention is visually more inconspicuous such that the composite pane is aesthetically more attractive or masking of the side edge of the functional element can be dispensed with. These are major advantages of the present invention.

The sealed region of the side edge of the functional element according to the invention can include the entire circumferential side edge, with the exception of any locations at which an electrical conductor for the electrical contacting of the surface electrodes is routed out of the functional element via the side edge. Said region of the side edge can, however, also include only part of the circumferential side edge, for example, a region of the side edge that is visible in the composite pane and not masked or concealed.

In a preferred embodiment, the functional element is a PDLC functional element (polymer dispersed liquid crystal). The active layer of a PDLC functional element contains liquid crystals that are embedded in a polymer matrix. When no voltage is applied on the surface electrodes, the liquid crystals are oriented in a disorderly fashion, resulting in strong scattering of the light passing through the active layer. When a voltage is applied on the surface electrodes, the liquid crystals align themselves in a common direction and the transmittance of light through the active layer is increased.

In another preferred embodiment, the functional element is an SPD functional element (suspended particle device). The active layer contains suspended particles, wherein the absorption of light by the active layer can be changed by applying a voltage on the surface electrodes. In principle, however, it is also possible to use other types of controllable functional elements, for example, electrochromic functional elements. The controllable functional elements mentioned and their mode of operation are known per se to the person skilled in the art such that a detailed description can be dispensed with here.

The functional element typically comprises the active layer between two surface electrodes. The active layer has the controllable optical properties that can be controlled via the voltage applied to the surface electrodes. The surface electrodes and the active layer are typically arranged substantially parallel to the surfaces of the outer pane and the inner pane. The surface electrodes are electrically connected to an external voltage source in a manner known per se. The electrical contacting is realised by means of suitable connecting cables, for example, foil conductors that are optionally connected to the surface electrodes via so-called bus bars, for example, strips of an electrically conductive material or electrically conductive imprints. The thickness of the functional element is, for example, from 0.4 mm to 1 mm.

The surface electrodes are preferably designed as transparent, electrically conductive layers. The surface electrodes preferably contain at least a metal, a metal alloy, or a transparent conducting oxide (TCO). The surface electrodes can contain, for example, silver, gold, copper, nickel, chromium, tungsten, indium tin oxide (ITO), gallium-doped or aluminium-doped zinc oxide, and/or fluorine-doped or antimony-doped tin oxide. The surface electrodes preferably have a thickness from 10 nm to 2 µm, particularly preferably from 20 nm to 1 µm, most particularly preferably from 30 nm to 500 nm.

The functional element is in particular present as a multilayer film with two outer carrier films. In such a multilayer film, the surface electrodes and the active layer are typically arranged between the two carrier films. Here, "outer carrier film" means that the carrier films form the two surfaces of the multilayer film. The functional element can thus be provided as a laminated film that can be processed advantageously. The functional element is advantageously protected by the carrier films against damage, in particular corrosion. The multilayer film contains, in the order indicated, at least one carrier film, one surface electrode, one active layer, another surface electrode, and another carrier film. Typically, the carrier films have in each case an electrically conductive coating that faces the active layer and functions as a surface electrode.

The second thermoplastic material of the carrier films is preferably polyethylene terephthalate (PET) or based thereon, as is customary with commercially available functional elements. The second thermoplastic material can also contain mixtures or copolymers of PET. However, the second thermoplastic material can also be or be based on, for example, EVA, PVB, PU, polypropylene, polycarbonate, polymethyl methacrylate, polyacrylate, polyvinyl chloride, polyacetate resin, fluorinated ethylene propylenes, polyvinyl fluoride, and/or ethylene tetrafluoroethylene. The thickness of each carrier film is preferably from 0.1 mm to 1 mm, particularly preferably from 0.1 mm to 0.2 mm. Typically, the two carrier films are made of the same material, but it is also, in principle, possible for the two carrier films to be made of a different material. Then, the first carrier film is, strictly speaking, made of the second thermoplastic material; and the second carrier film, of a third thermoplastic material.

The invention is particularly advantageous when the intermediate layer or the first thermoplastic material contains a plasticiser because the diffusion of plasticiser into the active layer through the side edge sealed according to the invention is prevented. In a particularly advantageous embodiment, the intermediate layer is made of plasticiser-containing polyvinyl butyral (PVB) or is based thereon. Typical PVB films used as an intermediate layer have a plasticiser content of at least 15 wt.-%. Used, for example, as plasticisers are aliphatic diesters of tri- or tetraethylene glycol, such as triethylene glycol-bis-(2-ethyl hexanoate).

The intermediate layer is formed from at least a first thermoplastic layer and a second thermoplastic layer, between which the functional element is arranged. The functional element is then bonded to the outer pane via a region of the first thermoplastic layer and to the inner pane via a region of the second thermoplastic layer. Preferably, the thermoplastic layers protrude circumferentially beyond the functional element. Where the thermoplastic layers are in direct contact with one another and are not separated from one another by the functional element, they can fuse during lamination such that the original layers are sometimes no longer discernible and, instead, a homogeneous intermediate layer is present.

A thermoplastic layer can, for example, be formed by a single thermoplastic film. A thermoplastic layer can also be formed from sections of different thermoplastic films whose side edges are placed against one another.

In a preferred embodiment, the functional element, more precisely, the side edges of the functional element, are surrounded circumferentially by a third thermoplastic layer. The third thermoplastic layer is frame-like with an opening into which the functional element is inserted. The third thermoplastic layer can be formed by a thermoplastic film into which the opening has been introduced by cutting. Alternatively, the third thermoplastic layer can also be composed of a plurality of film sections around the functional element. The intermediate layer is then formed from a total of at least three thermoplastic layers arranged sheetwise one over another, wherein the middle layer has an opening in which the functional element is arranged. During production, the third thermoplastic layer is arranged between the first and the second thermoplastic layer with the side edges of all thermoplastic layers preferably situated congruently. The third thermoplastic layer preferably has roughly the same thickness as the functional element. Thus, the local difference in thickness introduced by the locally limited functional element is compensated such that glass breakage during lamination can be avoided and improved optical appearance is created.

The layers of the intermediate layer are preferably formed from the same material, particularly preferably from plasticiser-containing PVB films. The thickness of each thermoplastic layer is preferably from 0.2 mm to 2 mm, particularly preferably from 0.3 mm to 1 mm, in particular from 0.3 mm to 0.5 mm, for example, 0.38 mm.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The panes can be clear, or also tinted or coloured, so long as the windshields have adequate light transmittance in the central field of vision, preferably at least 70% in the primary through-vision zone A per ECE-R43.

The outer pane, the inner pane, and/or the intermediate layer can have further suitable coatings known per se, for example, antireflection coatings, nonstick coatings, antiscratch coatings, photocatalytic coatings, or solar protection coatings, or low-E coatings.

The thickness of the outer pane and the inner pane can vary widely and thus be adapted to the requirements of the individual case. The outer pane and the inner pane preferably have thicknesses of 0.5 mm to 5 mm, particularly preferably of 1 mm to 3 mm.

The invention also includes a method for producing a composite pane according to the invention having electrically controllable optical properties, at least comprising the following steps:

a) A functional element having electrically controllable optical properties is provided in a desired shape and size. The functional element comprises at least an active layer between a first carrier film and a second carrier film made of a second thermoplastic material. The first carrier film and the second carrier film are fused together along at least one region of the side edge of the functional element.

b) An outer pane, a first thermoplastic layer, the functional element, a second thermoplastic layer, and an inner pane are arranged one over another in this order.

c) The outer pane and the inner pane are joined by lamination, wherein an intermediate layer having an embedded functional element is formed at least from the first thermoplastic layer and the second thermoplastic layer.

Functional elements are commercially available as multilayer films. Providing the functional element in step (a) preferably includes cutting the functional element out of such a multilayer film in the desired shape and size, in which it is to be later laminated into the composite pane. The cutting can be done mechanically, for example, with a knife. In an advantageous embodiment, the cutting is done by laser. It has been demonstrated that, in this case, the side edge is more stable than with mechanical cutting. With mechanically cut side edges, there can be a risk that the material will pull back, so to speak, which is visually conspicuous and adversely affects the aesthetics of the pane. The wavelength of the laser is preferably from 1 µm to 15 µm, particularly preferably from 8 µm to 12 µm. A $CO_2$ laser can be used, for example. The laser is preferably operated in the continuous wave mode, but can also, in principle, be operated in the pulsed mode. The laser power is preferably from 100 W to 500 W, particularly preferably from 200 W to 300 W. For cutting the multilayer film, the laser beam is preferably focused on the multilayer film, ensuring high power density and a thin cutting line.

Essential for the method according to the invention is the fusing of the carrier films in the edge region of the functional element, which seals the active layer. The fusing can be carried out before or after providing the functional element in the desired shape, i.e., the cutting of the functional element to size. In one embodiment, the functional element is first cut to size and the carrier films are subsequently fused. However, with suitable process control, it is alternatively also possible to weld the carrier films first, with the active layer situated therebetween "melted away", and not to trim the functional element into the desired shape until after that. The fusing of the carrier films can be done in various ways.

In a preferred embodiment, the fusing of the first carrier film and the second carrier film is done by laser irradiation. The laser radiation is moved along the region of the side edge of the functional element to be fused, with the carrier films being melted and bonding to one another. The laser power and the size of the laser spot determine the power density of the laser radiation, which, in turn, together with these speed of movement, determines the energy input. The energy input must be selected such that the carrier films are sufficiently heated to fuse together.

In order to impinge on a sufficiently large region of the carrier film with the laser beam, the laser radiation is preferably not focused on the multilayer films. Instead, the laser radiation is preferably defocused on the functional element, in order to obtain a beam profile with greater spatial expansion. The diameter of the beam profile (laser spot) on the multilayer film is preferably from 0.5 mm to 5 mm, particularly preferably from 1 mm to 3 mm. The laser power is preferably from 100 W to 500 W, particularly preferably from 200 W to 300 W. The speed of movement of the laser radiation is preferably 1 m/s at most. The wavelength of the laser is preferably from 1 µm to 15 µm, particularly preferably from 8 µm to 12 µm. Most particularly preferably used is a $CO_2$ laser with a wavelength of approx. 10.6 µm. The $CO_2$ laser has, in addition to a suitable wavelength, the advantage of a large-area beam profile. However, alternatively, diode lasers or solid-state lasers can be used. The laser is preferably operated in the continuous wave mode. If the laser is operated in pulsed mode, the pulse frequency is preferably at least 10 kHz, to ensure sufficient energy input into the carrier films.

In a first variant of fusing by laser irradiation, the first carrier film and the second carrier film are fused directly to one another. The beam direction of the laser radiation should enclose an angle of 45° to 90° with the functional element, in particular, should strike the functional element substantially perpendicular, i.e., enclose an angle of approx. 90° with the functional element. Here, the functional element is arranged substantially horizontally, with the functional element preferably placed on a firm support and the laser radiation preferably striking the functional element from above. This ensures that the melted material of the upper carrier film flows under the effect of gravity in the direction of the second carrier film and bonds therewith.

During the laser irradiation, the functional element can optionally be arranged between two fixing plates, by which means the functional element is held in place securely and in a flat state. The functional element rests substantially horizontally on the lower fixing plate, and the upper fixing plate rests on the functional element. The upper fixing plate must, of course, have a passage in the shape of the region of the side edge of the functional element to be fused such that the functional element can be acted upon with laser radiation through the fixing plate. The passage extends in plan view along the region of the side edge of the functional element to be fused (length dimension) and has a width of, for example, 3 mm to 10 mm. Suitable as fixing plates are, for example, metal or steel plates with a thickness of 2 mm to 20 mm, preferably of 2 mm to 10 mm.

In a second variant of fusing by laser irradiation, the carrier films are fused together indirectly via a thermoplastic connecting piece. The region of the side edge of the functional element to be sealed is provided in the desired shape, in particular by cutting a multilayer film. The connecting piece, for example, a strip of a thermoplastic film, is placed on the region of the open side edge to be sealed. The connecting piece is preferably made of the second thermoplastic material, from which the carrier films are also manufactured. The functional element is preferably arranged substantially vertically, with the region of the side edge to be sealed pointing upward, for example, using suitable fixing devices. The connecting piece rests on the side edge. The connecting piece is then irradiated with the laser, with the melted material flowing under the effect of gravity in the direction of the carrier films and bonding therewith. The laser radiation preferably strikes the connecting piece from above, enclosing an angle of 0° to 45° with the functional element, preferably approx. 0°.

In another preferred embodiment, the fusing of the carrier film is done by contact with a heated tool. By means of the heated tool, thermal energy is transferred directly onto the side edge of the functional element, as a result of which the carrier films are fused together. The temperature of the heated tool depends on the second thermoplastic material and on the exposure time. With customary carrier films, preferred temperatures are from 200° C. to 250° C. The carrier films should be heated just below their melting temperature such that they are softened and bond with one another without, however, becoming completely liquefied and losing their shape.

In a first variant, the heated tool is heated tongs. The tongs press the carrier films against one another and melt them simultaneously, as a result of which the carrier films bond. The tongs act at any given time only on a comparatively small section of the side edge of the functional element corresponding to the width of their working areas. The working areas are moved along the region of the side edge to be sealed such that the entire region is gradually processed completely by the tongs.

In a second variant, the heated tool is at least one heating plate. The heating plate has a heated section in the shape of the region of the side edge of the functional element to be sealed. For example, heating coils are embedded in a metal or steel plate in this region. The region of the side edge of the functional element to be sealed is arranged on or below the heated section. The rest of the heating plate is not heated. Preferably, the functional element is positioned between two such heating plates with congruently arranged heating areas. However, the functional element can, in principle, also be arranged between one heating plate and one unheated fixing plate.

After the fusing of the carrier films, there can possibly be contact of the surface electrodes, resulting in a short-circuit. It is, consequently, advantageous to electrically isolate the edge region of the at least one surface electrode adjacent the sealed region of the side edge from the other surface electrode. This is preferably done by means of an isolation line that is introduced into the surface electrode by laser radiation. The isolation line is preferably located 0.1 mm to 5 mm from the side edge of the surface electrode, particularly preferably 0.5 mm to 2 mm. The entire peripheral edge region of the surface electrode can be isolated with a circumferential isolation line. Alternatively, the isolation line can run between two points of the side edge of the surface electrode to isolate only the region of the surface electrode directly adjacent the sealing. The laser processing can produce a thin, optically inconspicuous isolation line without damaging the carrier film typically positioned above it. The line width of the isolation line can, for example, be less than or equal to 500 µm, preferably from 10 µm to 150 µm, particularly preferably from 20 µm to 50 µm. The laser radiation is preferably focused on the surface electrode in order to obtain a low line width and sufficient power density. The focus is then moved along a line across the surface electrode, preferably at a speed of 100 mm/s to 10000 mm/s, particularly preferably of 200 mm/s to 5000 mm/s, with the conductive material removed or chemically or physically altered such that it has either no electrical conductivity or greatly reduced electrical conductivity, thus producing the isolation line. The wavelength of the laser radiation is preferably from 150 nm to 1200 nm, particularly preferably from 200 nm to 500 nm. It has been demonstrated that, with the use of customary electrically conductive layers and customary carrier films, this wavelength range is particularly suitable for selectively introducing the line into the electrically conductive layer without damaging the carrier film. A solid-state laser, for example, an Nd:Cr:YAG laser, an Nd:Ce:YAG laser, or a Yb:YAG laser, is preferably used as the laser. To generate the desired wavelength, the radiation of the laser can be frequency doubled one or more times. However, other lasers can also be used, for example, fiber lasers, semiconductor lasers, excimer lasers, or gas lasers. The laser is preferably operated in pulsed mode, in particular with pulses in the nanosecond or picosecond range. This is particularly advantageous in terms of high power density. The pulse length is preferably less than or equal to 50 ns. The pulse frequency is preferably from 1 kHz to 200 kHz, particularly preferably from 10 kHz to 100 kHz, for example, from 30 kHz to 60 kHz. The output power of the laser radiation is preferably from 0.1 W to 50 W, for example, from 0.3 W to 10 W. The isolation line can be produced before or after the fusing of the carrier films.

When arranging the layer stack in step (b), the functional element is preferably positioned such that it does not extend all the way to one of the side edges of the layer stack. The functional element is thus advantageously embedded in the intermediate layer, without having contact with the surrounding atmosphere. In a particularly preferred embodiment, a third thermoplastic layer is arranged between the first and the second thermoplastic layer. The third thermoplastic layer has a cutout that is coordinated in shape and size with the functional element. The functional element is inserted as precisely as possible into the cutout such that it is circumferentially surrounded by the thermoplastic layer. The third thermoplastic layer compensates the thickness of the functional element in the regions around the functional element such that a mechanically and optically improved composite pane results.

The thermoplastic layers are preferably formed by thermoplastic films. The films are preferably trimmed according to the outline of the composite pane. The panes and the thermoplastic films are arranged substantially congruently one above another. The thermoplastic layers can also be composed of multiple film sections.

It is possible to arrange additional thermoplastic layers between the outer pane and the inner pane which then also become part of the intermediate layer.

For the electrical contacting, cables, in particular flat conductors, are connected to the surface electrodes and routed out of the layer stack via the side edge. The connection of the cables is, of course, done prior to lamination of the windshield.

Any prints that are present, for example, opaque masking prints or printed bus bars for the electrical contacting of the functional element are preferably applied by screen printing.

The lamination is preferably done under the action of heat, vacuum, and/or pressure. Methods known per se can be used for lamination, for example, autoclave methods, vacuum bag methods, vacuum ring methods, calender methods, vacuum laminators, or combinations thereof.

The invention also includes the use of a composite pane according to the invention in buildings or in means of transportation for travel on land, in the air, or on water. The composite pane is preferably used as a window pane, for example, as a window pane of vehicles, of buildings, or of rooms in the interior of buildings. The composite pane is particularly preferably used as a windshield of a motor vehicle with an electrically controllable sun visor that is realised by the functional element.

The composite pane is preferably intended as a window pane, particularly preferably as a window pane of a vehicle, in particular a motor vehicle, a building, or a room. In a particularly advantageous embodiment, the composite pane is the windshield of a motor vehicle, in particular a passenger car, with an electrically controllable sun visor that is realised by the functional element. Whereas the side edges and the upper edge of such a functional element are typically concealed by the customary masking print in the edge region of the pane, the lower edge is arranged in the through-vision region of the pane and is therefore not masked and is visible. This lower edge of the functional element is preferably sealed according to the invention. The optically inconspicuous sealing is particularly advantageous here.

An electrically controllable sun visor can make the conventional, mechanically pivoting sun visor superfluous. As a result, space is gained in the vehicle's passenger compartment, the vehicle's weight is reduced, and in the event of hard braking or an accident, the risk of colliding with the sun visor is avoided. In addition, the electrical control of the sun visor can be perceived as more convenient than mechanically folding it down.

The windshield has an upper edge and a lower edge as well as two side edges running between the upper edge and the lower edge. "Upper edge" refers to the edge that is intended to point upward in the installation position. "Lower edge" refers to the edge that is intended to point downward in the installation position. The upper edge is also often referred to as the "roof edge"; the lower edge, as the "engine edge". The edges of the functional element are referred to according to the installation position of the windshield. The lower edge of the functional element is thus the one of its side edges that points away from the upper edge and points toward the central field of vision. The upper edge of the functional element points toward the upper edge of the windshield. The side edges run between the upper edge and lower edge.

Windshields have a central field of vision, the optical quality of which is subject to high requirements. The central field of vision must have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the Economic Commission for Europe of the United Nations (UN/ECE) (ECE-R43, "Uniform Provisions concerning the Approval of Safety Glazing Materials and Their Installation on Vehicles"). There, the field of vision B is defined in Annex 18.

The functional element is arranged above the central field of vision (field of vision B). This means that the functional element is arranged in the region between the central field of vision and the upper edge of the windshield. The functional element does not have to cover the entire area, but is positioned completely within this area and does not protrude into the central field of vision. In other words, the functional element is less distant from the upper edge of the windshield than the central field of vision. Thus, the transmittance of the central field of vision is not affected by the functional element which is positioned in a location similar to that of a conventional mechanical sun visor in the folded-down state.

Preferably, the region of the intermediate layer via which the functional element is joined to the outer pane and/or the inner pane is tinted or coloured. The transmittance of this region in the visible spectral range is thus reduced compared to a layer that is not tinted or coloured. The tinted/coloured region of the thermoplastic layer thus reduces the transmittance of the windshield in the region of the sun visor. In particular, the aesthetic impression of the functional element is improved because the tinting results in a more neutral impression which has a more pleasant effect on the viewer. A particularly aesthetic impression of the vehicle from the outside is achieved when the region of the intermediate layer between the functional element and the outer pane is tinted. In the visible spectral range, the tinted or coloured region of the thermoplastic layer preferably has transmittance of 10% to 50%, particularly preferably of 20% to 40%. This yields particularly good results in terms of glare protection and optical appearance. The thermoplastic layer can be implemented by a single thermoplastic film in which the tinted or coloured region is produced by local tinting or colouring. Such films can, for example, be obtained by coextrusion. Alternatively, an untinted film section and a tinted or coloured film section can be combined to form the thermoplastic layer. The tinted or coloured region can be homogeneously coloured or tinted, in other words, can have location-independent transmittance. However, the tinting or colouring can also be inhomogeneous; in particular, a transmittance progression can be realised. In one embodiment, the transmittance level in the tinted or coloured region decreases, at least in sections, with an increasing distance from the upper edge. Thus, sharp edges of the tinted or coloured region can be avoided such that the transition from the sun visor into the transparent region of the windshield is gradual, which looks more pleasant aesthetically.

The electrical control of the sun visor is done, for example, using buttons, rotary knobs, or sliders that are integrated into the dashboard of the vehicle. However, a switch area, for example, a capacitive switch area, for controlling the sun visor can also be integrated into the windshield. Alternatively, the sun visor can also be controlled by contactless methods, for example, by gesture recognition, or as a function of the pupil or eyelid state detected by a camera and suitable evaluation electronics.

In a preferred embodiment, the lower edges of the functional element and of the tinted region of the thermoplastic layer are adapted to the shape of the upper edge of the windshield, yielding a more appealing visual impression. Since the upper edge of a windshield is typically curved, in particular concavely curved, the lower edge of the functional element and of the tinted region is also preferably curved. Particularly preferably, the lower edges of the functional element are substantially parallel to the upper edge of the windshield. It is, however, also possible to construct the sun visor from two halves, each straight, arranged at an angle relative to one another, and forming a virtually V-shaped upper edge.

In an advantageous further development of the invention, the functional element can be divided into segments by isolation lines. The isolation lines are in particular introduced into the surface electrodes such that the segments of the surface electrode are isolated from one another electrically. The individual segments are connected to the voltage source independently of one another such that they can be actuated separately. Thus, different regions of the sun visor can be switched independently. Particularly preferably, the isolation lines and the segments are arranged horizontally in the installation position. Thus, the height of the sun visor can be controlled by the user. The term "horizontal" is to be interpreted broadly here and refers to a direction of expansion that runs between the side edges of the windshield. The isolation lines do not necessarily have to be straight, but can also be slightly curved, preferably adapted to possible curvature of the upper edge of the windshield, in particular substantially parallel to the upper edge of the windshield. Vertical isolation lines are, of course, also conceivable. The isolation lines have, for example, a width of 5 µm to 500 µm, in particular 20 µm to 200 µm. The width of the segments, i.e., the distance between adjacent isolation lines can be suitably selected by the person skilled in the art according to the requirements of the individual case. Already laminated multilayer films can also be subsequently segmented by laser ablation.

The upper edge and the side edges of the functional element are concealed in through-vision through the windshield, preferably by an opaque masking print. Windshields typically have a circumferential peripheral masking print made of an opaque enamel, which serves in particular to protect and to visually conceal the adhesive used for installation of the pane against UV radiation. This peripheral masking print is preferably used to also conceal the upper edge and the side edge of the functional element as well as the necessary electrical connections. The sun visor is then advantageously integrated into the appearance of the windshield, and only the lower edge is potentially discernible to the viewer. Preferably, both the outer pane and also the inner pane have a masking print such that through-vision in the edge region is prevented from both sides.

The functional element (or the totality of the functional elements in the above-described case of a plurality of functional elements) is preferably arranged over the entire width of the windshield, minus an edge region on both sides having a width of, for example, 2 mm to 20 mm. The functional element preferably also has a distance of, for example, 2 mm to 20 mm from the upper edge. The functional element is thus encapsulated within the intermediate layer and protected against contact with the surrounding atmosphere and corrosion.

Figure 2:
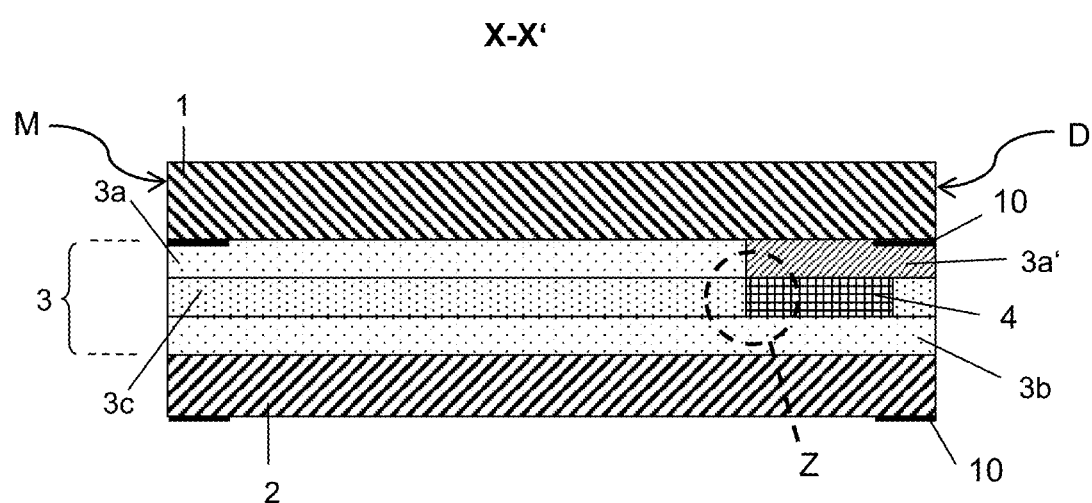
Figure 3:
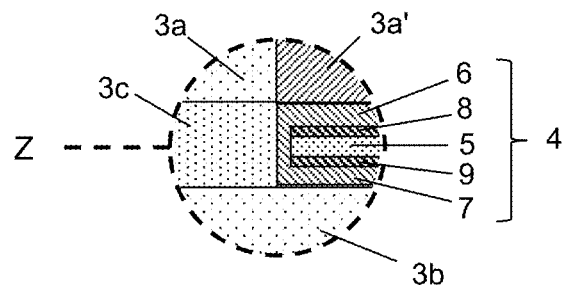
Figure 4:
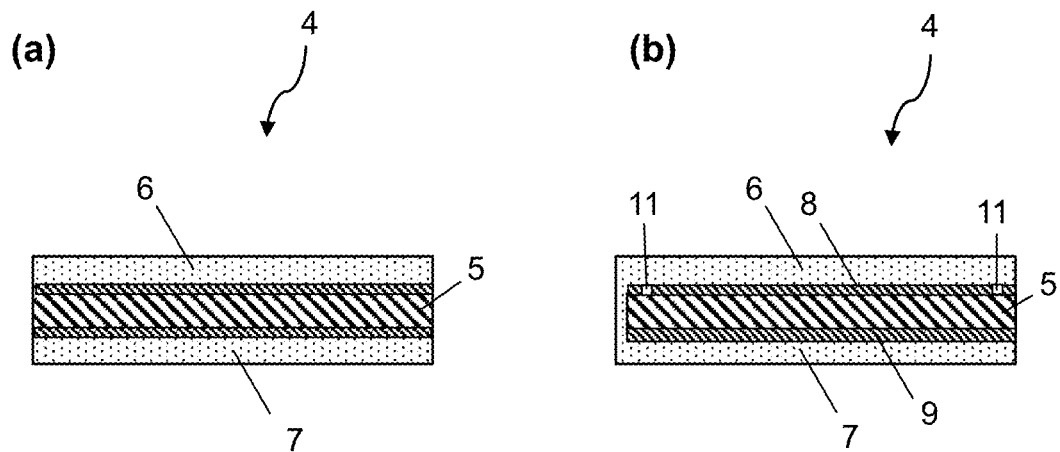
Figure 5:
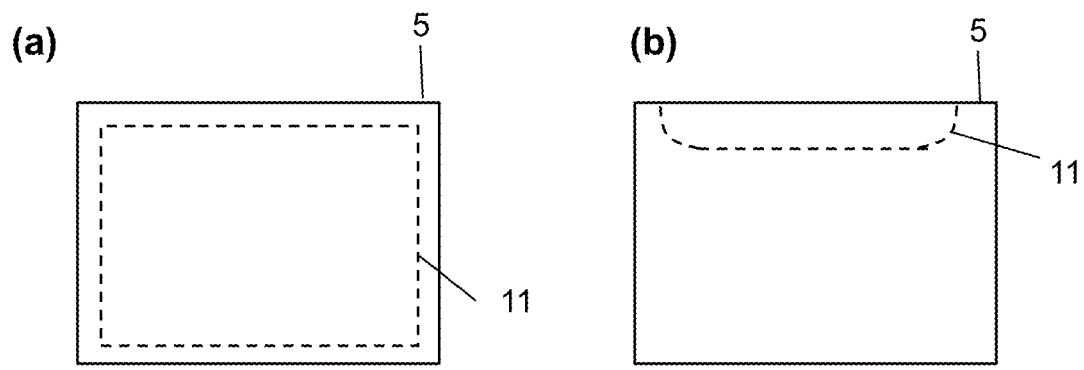
Figure 6:
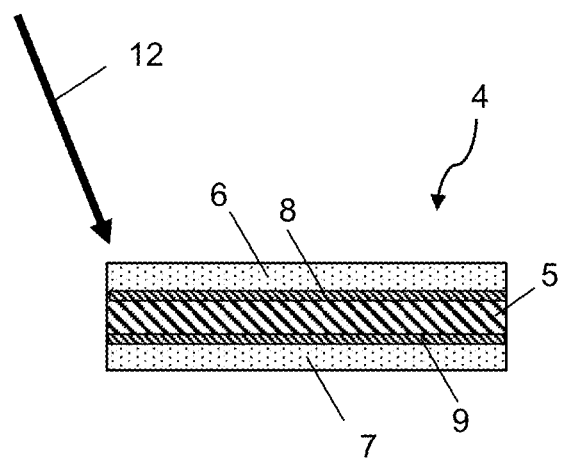
Figure 7:
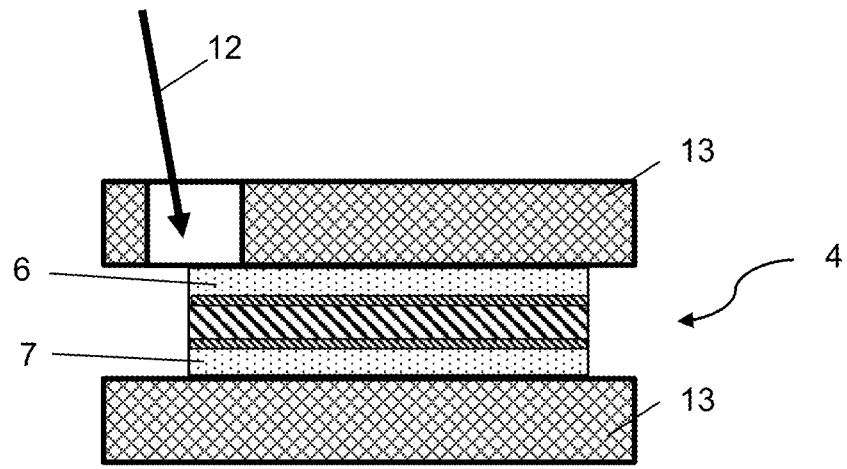
Figure 8:
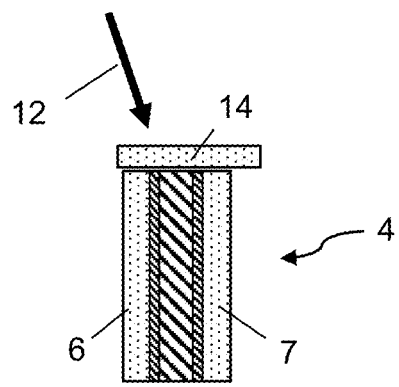
Figure 9:
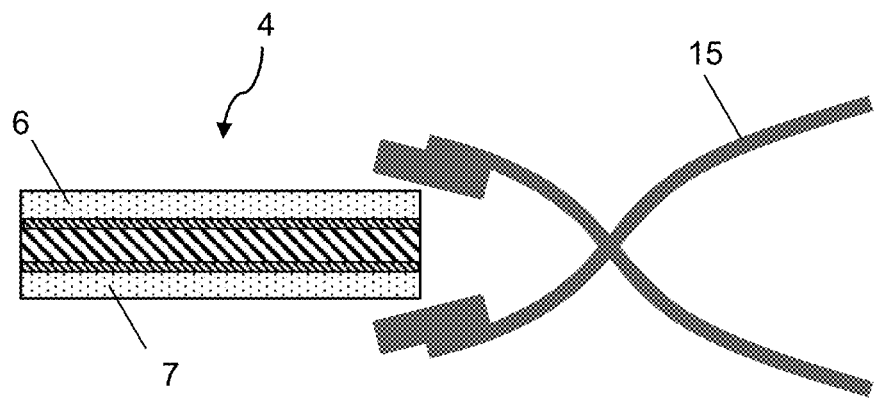
Figure 10:
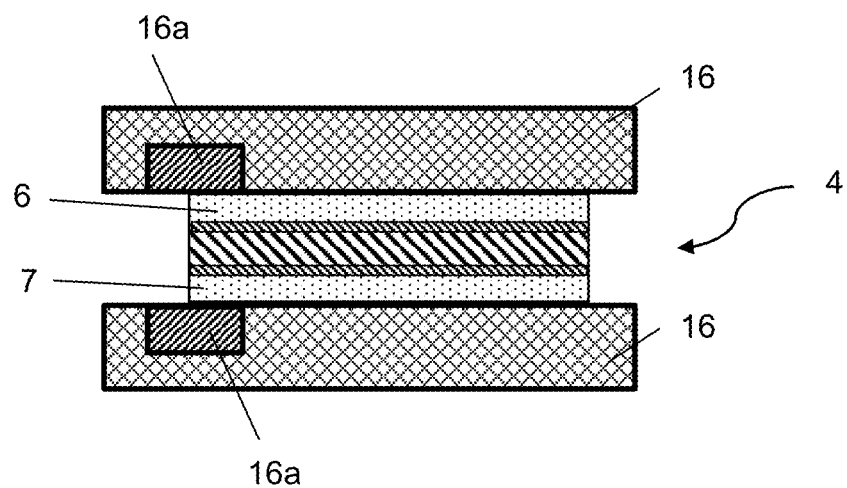
Figure 11:
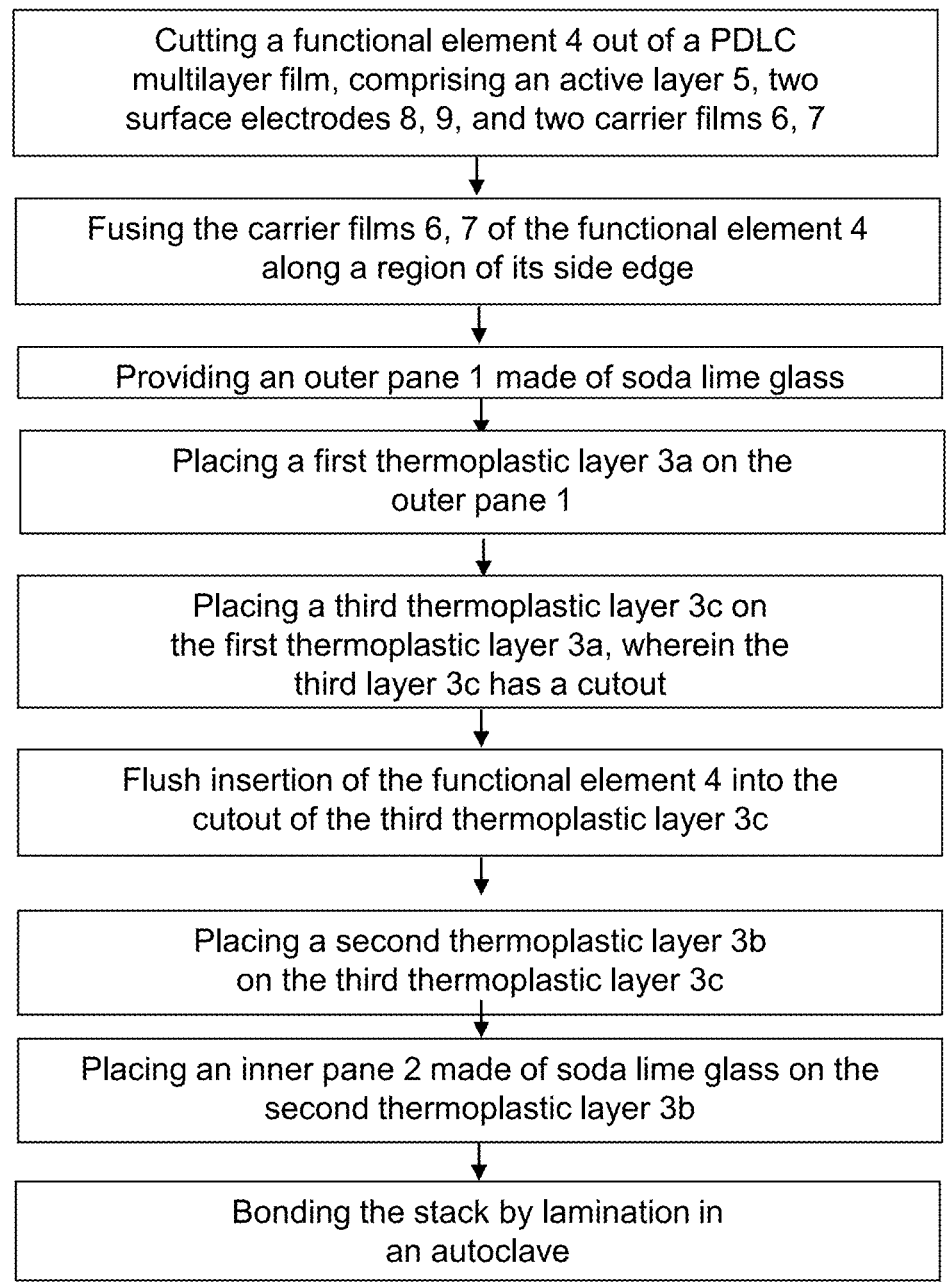

The invention is explained in detail with reference to drawings and exemplary embodiments. The drawings are schematic representations and not to scale. The drawings in no way restrict the invention. They depict:

FIG. 1 a plan view of a first embodiment of the composite pane according to the invention as a windshield with an electrically controllable sun visor, FIG. 2 a cross-section through the windshield of FIG. 1, FIG. 3 an enlarged representation of the region Z of FIG. 2, FIG. 4 a cross-section through a functional element before and after the sealing according to the invention, FIG. 5 a plan view of a functional element with an isolation line, FIG. 6 a cross-section through a functional element during an embodiment of the sealing, FIG. 7 a cross-section through a functional element during another embodiment of the sealing, FIG. 8 a cross-section through a functional element during another embodiment of the sealing, FIG. 9 a cross-section through a functional element during another embodiment of the sealing, FIG. 10 a cross-section through a functional element during another embodiment of the sealing, and FIG. 11 an exemplary embodiment of the method according to the invention with reference to a flowchart.

FIG. 1, FIG. 2, and FIG. 3 depict in each case a detail of a windshield with an electrically controllable sun visor, a preferred embodiment of the composite pane according to the invention having electrically controllable optical properties. The windshield comprises an outer pane 1 and an inner pane 2 that are joined to one another via an intermediate layer 3. The outer pane 1 has a thickness of 2.1 mm and is made of a green-coloured soda lime glass. The inner pane 2 has a thickness of 1.6 mm and is made of a clear soda lime glass. The windshield has an upper edge D facing the roof in the installation position and a lower edge M facing the engine compartment in the installation position.

The windshield is equipped with an electrically controllable sun visor S in a region above the central field of vision B (as defined in ECE-R43). The sun visor S is formed by a commercially available PDLC multilayer film as a functional element 4 that is embedded in the intermediate layer 3. The height of the sun visor is, for example, 21 cm. The intermediate layer 3 comprises a total of three thermoplastic layers 3a, 3b, 3c, implemented in each case by a thermoplastic film with a thickness of 0.38 mm made of PVB. The first thermoplastic layer 3a is joined to the outer pane 1; the second thermoplastic layer 3b, to the inner pane 2. The third thermoplastic layer 3c positioned therebetween has a cutout, into which the cut-to-size PDLC multilayer film is inserted with substantially precise fit, in other words, roughly flush on all sides. The third thermoplastic layer 3c thus forms, so to speak, a sort of passe-partout for the approx. 0.4-mm-thick functional element 4, which is thus encapsulated all around in a thermoplastic material and is protected thereby.

The first thermoplastic layer 3a has a tinted region 3a' that is arranged between the functional element 4 and the outer pane 1. The light transmittance of the windshield is thus additionally reduced in the region of the sun visor 4, and the milky appearance of the PDLC functional element 4 in the diffuse state is mitigated. The aesthetics of the windshield are thus designed significantly more appealing. The first thermoplastic layer 3a has in the region 3a', for example, an average light transmittance of 30%, with which good results are obtained. The region 3a' can be homogeneously tinted. However, it is often more visually appealing for the tinting to decrease in the direction of the lower edge of the functional element 4 such that the tinted and non-tinted region transition smoothly into one another. In the case depicted, the lower edges of the tinted region 3a' and the PDLC functional element 4 are arranged flush. However, this is not necessarily the case. It is also possible for the tinted region 3a' to protrude beyond the functional element 4 or, conversely, for the functional element 4 to protrude beyond the tinted region 3a'.

The controllable functional element 4 is a multilayer film consisting of an active layer 5 between two surface electrodes 8, 9 and two carrier films 6, 7. The active layer 5 contains a polymer matrix with liquid crystals dispersed therein that are oriented as a function of the electrical voltage applied on the surface electrodes, by which means the optical properties can be controlled. The carrier films 6, 7 are made of PET and have a thickness of, for example, 0.125 mm. The carrier films 6, 7 are provided with a coating of ITO facing the active layer 5 and having a thickness of approx. 100 nm which form the surface electrodes 8, 9. The surface electrodes 8, 9 can be connected to the vehicle's electrical system via bus bars (not shown) (formed, for example, by a silver-containing screen print) and connection cables (not shown).

The windshield has, as is customary, a circumferential peripheral masking print 10 that is implemented by an opaque enamel on the interior-side surfaces (facing the interior of the vehicle in the installation position) of the outer pane 1 and the inner pane 2. The distance of the functional element 4 from the upper edge D and the side edges of the windshield is less than the width of the masking print 10 such that the side edges of the functional element 4—with the exception of the side edge pointing toward the central field of vision B—are concealed by the masking print 10. The electrical connections (not shown) are also reasonably mounted in the region of the masking print 10 and thus concealed.

Along the lower side edge of the functional element 4 pointing toward the central field of vision B, the carrier films 6, 7 are fused together. The functional element 4 is sealed along this side edge. Thus, diffusion into or out of the active layer 5 is prevented. The sealing prevents, in particular, the diffusion of plasticisers and other adhesive components of the thermoplastic intermediate layer 3 into the active layer 5, thus reducing the aging of the functional element 4. The sealing is optically inconspicuous; consequently, the lower side edge of the functional element 4, which is not concealed by the masking print 10, is not distracting.

FIG. 4 schematically depicts a cross-section through a functional element 4 comprising the active layer 5, the surface electrodes 8, 9, and the carrier films 6, 7. The functional element 4 was cut out of a commercially available PDLC multilayer film in the desired shape and size.

Initially, it has open side edges (FIG. 4a) such that, in particular, the active layer 5 has direct contact with the environment. After sealing according to the invention, the carrier films 6, 7 are fused together along a region of the side edge (FIG. 4b). The active layer 5 is effectively separated from the environment.

In order to avoid short-circuits that could develop as a result of direct contact between the surface electrodes 8,9 after the fusing of the carrier films 6, 7, a circumferential isolation line 11, for example, can be introduced into at least one surface electrode 6, at a distance from the side edge of, for example, 1 mm. The isolation line 11 electrically isolates the peripheral edge region of the surface electrode 6 such that it is no longer supplied with voltage and no short-circuit can develop. The isolation line 11 can, for example, be introduced using an Nd-YAG laser operated in pulsed mode, whose emission wavelength of 1064 nm had been converted by frequency doubling a wavelength of 355 nm twice. The pulse length is, for example, 16 ns, the pulse frequency 60 kHz, the laser power 60 W, and the speed of movement 1000 mm/s. The laser radiation is focused on the surface electrode.

FIG. 5 depicts a plan view of a functional element 4, wherein the course of the isolation line 11 can be seen schematically. The entire peripheral edge of the surface electrode can be isolated with a circumferential isolation line 11 (FIG. 5a). Alternatively, the isolation line 11 can run between two points on the side edge of the surface electrode to isolate only the region of the surface electrode directly adjacent the sealing (FIG. 5b).

FIG. 6 depicts a functional element 4 during a first embodiment of the sealing of a region of its side edge by laser radiation. The functional element 4 is positioned substantially horizontally on a firm support (not shown). The laser radiation 12 strikes the side edge of the functional element 4 from above. The carrier films 6, 7 are heated and partially melted. The material of the upper carrier films 6 flows downward and bonds to the the second carrier film 7.

FIG. 7 depicts a functional element 4 during a second embodiment of the sealing of a region of its side edge by laser radiation. In contrast to the embodiment of FIG. 6, the functional element 4 is not lying exposed on a support, but, instead, is arranged horizontally between two fixing plates 13. The upper fixing plate 13 has a passage or opening, whose shape corresponds to the contour of the region of the side edge of the functional element 4 to be sealed, and its width is, for example, 5 mm. The region of the side edge of the functional element 4 to be sealed is arranged below the opening, such that it is accessible for the laser radiation 12. is positioned substantially horizontally on a firm support (not shown). The side edge is irradiated through the opening by the laser radiation 12, and, as a result, the carrier films 6, 7 are fused together, as in FIG. 6.

FIG. 8 depicts a functional element 4 during a third embodiment of the sealing of a region of its side edge by laser radiation. The functional element 4 is arranged substantially vertically, with the region of the side edge to be sealed pointing upward. A strip of a PET film is placed on the region to be sealed as a thermoplastic connecting piece 14. The side edge with the connecting piece 14 is irradiated from above by laser radiation 12, with the carrier films 6, 7 being fused together via the connecting piece 14.

For the embodiments of FIGS. 6, 7, and 8, substantially identical laser parameters can be used. Suitable, for example, is a $CO_2$ laser with a wavelength of 10.6 µm in continuous wave mode operation with an output power of 250 W. The laser radiation 12 should be defocused on the functional element with a spot size of, for example, 2 mm. It is moved at a speed of, for example, 0.1 m/s to 0.5 m/s along the side edge to be sealed.

FIG. 9 depicts a functional element 4 during a first embodiment of the sealing of a region of its side edge using a heated tool. The tool is heated tongs 15. The working areas of the tongs 15 are heatable and are heated to a temperature of, for example, 250° C. The carrier films 6, 7 of the functional element 4 are pressed against each other along the entire region of the side edge to be sealed by means of the tongs 15, with the carrier films being melted by the heated working areas and bonding to one another.

FIG. 10 depicts a functional element 4 during a second embodiment of the sealing of a region of its side edge using a heated tool. Here, two heating plates 16, between which the functional element is arranged, are used as heated tools. The heating plates 16 have a heated region 16a, whose shape corresponds to the contour of the region of the side edge of the functional element 4 to be sealed. The heated regions 16a of the heating plates 16 are arranged congruent to one another, and the region of the side edge of the functional element 4 to be sealed is arranged between the heated regions 16a such that the carrier films 6, 7 R melted and bonded to one another. The temperature of the heated region 16a is, for example, 250° C.

FIG. 11 depicts an exemplary embodiment of the production method according to the invention with reference to a flowchart.

LIST OF REFERENCE CHARACTERS (1) outer pane
(2) inner pane
(3) thermoplastic intermediate layer
(3a) first layer of the intermediate layer 3
(3a') tinted region of the first layer 3a
(3b) second layer of the intermediate layer 3
(3c) third layer of the intermediate layer 3
(4) functional element having electrically controllable optical properties
(5) active layer of the functional element 4
(6) first carrier film of the functional element 4
(7) second carrier film of the functional element 4
(8) surface electrode of the functional element 4
(9) surface electrode of the functional element 4
(10) masking print
(11) isolation line
(12) laser radiation
(13) fixing plate
(14) thermoplastic connecting piece
(15) heated tongs
(16) heating plate
(16a) heated region of the heating plate 16
S electrically controllable sun visor
B central field of vision of the windshield
D upper edge of the windshield, roof edge
M lower edge of the windshield, engine edge
X-X' section line
Z enlarged region

The invention claimed is:

1. Composite pane having electronically controllable optical properties, comprising an outer pane and an inner pane that are joined to one another via a thermoplastic intermediate layer,
   wherein a functional element having electrically controllable optical properties is embedded in the intermediate layer, the functional element comprising an active layer, a first carrier film and a second carrier film, the active layer arranged between the first carrier film and the second carrier film,
   wherein the thermoplastic intermediate layer contains a first thermoplastic material and the first and second carrier films contain a second thermoplastic material,
   wherein the second thermoplastic material differs from the first thermoplastic material,
   wherein the first thermoplastic material contains a plasticizer, and
   wherein the first carrier film and the second carrier film are fused together along at least one region of a side edge of the functional element to prevent the plasticizer from diffusing from the first thermoplastic material into the active layer via said at least one region.

2. The composite pane according to claim 1, wherein the second thermoplastic material is polyethylene terephthalate (PET).

3. The composite pane according to claim 1, wherein the functional element is a PDLC functional element or an SPD functional element.

4. The composite pane according to claim 1, wherein the first thermoplastic material is a plasticiser-containing polyvinyl butyral (PVB).

5. Method for producing a composite pane having electrically controllable optical properties, comprising:
   a) providing a functional element having electrically controllable optical properties, the functional element comprising an active layer, a first carrier film and a second carrier film both made of a second thermoplastic material, the active layer arranged between the first carrier film and the second carrier film, and
      the first carrier film and the second carrier film are fused together along at least one region of a side edge of the functional element,
   b) arranging an outer pane, a first thermoplastic layer, the functional element, a second thermoplastic layer, and an inner pane one over another in this order, wherein the first thermoplastic layer and the second thermoplastic layer are made of a first thermoplastic material that differs from the second thermoplastic material, wherein the first thermoplastic material contains a plasticizer,
   c) joining the outer pane and the inner pane by lamination, wherein an intermediate layer having an embedded functional element is formed from the first thermoplastic layer and the second thermoplastic layer,
      wherein the first carrier film and the second carrier film are fused together along said at least one region of the side edge of the functional element to prevent the plasticizer from diffusing from the first thermoplastic material into the active layer via said at least one region.

6. The method according to claim 5, wherein the fusing of the first carrier film and the second carrier film is done by laser radiation.

7. The method according to claim 6, wherein the laser radiation on the functional element is defocused with a diameter of the beam profile of 0.5 mm to 5 mm.

8. The method according to claim 6, wherein laser radiation with a wavelength of 1 μm to 15 μm and an output power of 100 W to 500 W in continuous wave mode or with a pulse frequency of at least 10 kHz is moved at a speed of at most 1 m/s along the at least one region of the side edge of the functional element.

9. The method according to claim 6, wherein the first carrier film and the second carrier film are fused directly to one another.

10. The method according to claim 9, wherein the functional element is arranged between two fixing plates and the region of the side edge of the functional element is acted upon by the laser radiation through a passage in one of the two fixing plates.

11. The method according to claim 6, wherein the first carrier film is fused to the second carrier film via a thermoplastic connecting piece.

12. The method according to claim 5, wherein the first and second carrier films are fused together by means of heated tongs.

13. The method according to claim 5, wherein the first and second carrier films are fused together by means of at least one heating plate that has a heated region in the shape of the at least one region of the side edge of the functional element in which the first and second carrier films are fused together.

14. The method according to claim 5, wherein an isolation line is introduced by laser radiation into at least one surface electrode of the functional element, which line electrically isolates an edge region of the surface electrode, which region is adjacent the at least one region of the side edge of the functional element with the fused first and second carrier films, from the other surface electrode.

15. A method comprising utilizing a composite pane according to claim 1 as a window pane of a buildings, of a rooms in an interior of a buildings, or of a vehicle.

16. The method according to claim 15, wherein the window pane is a windshield of a motor vehicle with an electrically controllable sun visor.

* * * * *